MINIATURE ROTARY MULTIPOLAR SELECTOR SWITCH WITH ROTOR RESILIENT CONDUCTIVE BRUSH AND BALL CONTACT STRUCTURE

Filed Jan. 4, 1965 2 Sheets-Sheet 1

INVENTOR.
ARTHUR C. METZGER
BY Harry M. Saragovitz, Edward J. Kelly, Herbert Berl & S. Dubroff
ATTORNEYS INVENTOR.
ARTHUR C. METZGER
BY Harry M. Saragovitz,
Edward J. Kelly, Herbert Berl
& S. Dubroff
ATTORNEYS United States Patent Office 3,263,033
Patented July 26, 1966

3,263,033

MINIATURE ROTARY MULTIPOLAR SELECTOR SWITCH WITH ROTOR RESILIENT CONDUCTIVE BRUSH AND BALL CONTACT STRUCTURE

Arthur C. Metzger, 16 Forty Acre Drive, Wayland, Mass.

Filed Jan. 4, 1965, Ser. No. 423,400
4 Claims. (Cl. 200—8)

Figure 1:
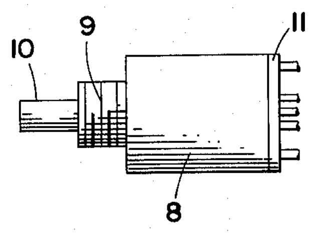

The invention described herein may be manufactured and used by or for the Government for governmental purposes without the payment to me of any royalty thereon.

The present invention relates to rotary multipolar selector switches for connecting one or more electrical or signal input circuits selectively each with a series of output circuits, and has for its primary object to provide an improved switch of this type which is adapted for extreme miniaturization and use in modern compact and light-weight electronic and like equipments.

At present there are few if any truly miniature electrical switches of this type commercially available. With the development of miniature electronic equipment, such as for the space program for example, there has developed a need for compatible electro-mechanical components which, like associated electronic components, must be very small, light-weight and rugged in construction. In many cases at present the electronic packaging cannot be reduced in size because of the switching device where the rotary selector type is required or highly desirable. Toggle and lever type switches have been miniaturized effectively, whereas the rotary selector type has not to the extent required. Presently desired but heretofore not attained is adequate operating capacity in a size less than one-half inch in outside diameter and closely approaching one inch in overall length including a rotary control shaft.

It is therefore a further object of this invention to provide an improved miniature rotary multipolar selector switch which is of light weight and simplified construction whereby it is compatible in size for use in modern miniaturized electronic and electrical equipments.

It is also a further and related object of this invention to provide an improved non-metallic switch of this type which utilizes substantially all plastic structural elements and is readily adapted for encapsulating and sealing in molded electronic assemblies.

In extremely miniature selector switches of this type the transfer of signals, voltages or currents from one or more circuits selectively to others therethrough must also provide for circuit isolation and denial of signal, voltage or current leakage and transfer to any except as selected. This has heretofore also been difficult to do because of the inherently close spacing of the conductive elements.

It is, therefore, a still further object of this invention to provide an improved miniature rotary multipolar selector switch having a simplified and effective construction which allows the maximum use of insulating materials for circuit isolation and minimum signal and electrical leakage between circuits.

In accordance with the invention, a non-metallic rotary selector switch is provided for the first time in commercial form and within size limits adapted for use with miniaturized electronic and electrical components. This allows the switch to be molded from plastic, light-weight non-conductive materials. The molded parts or elements provide means for supporting, containing and isolating the conductive parts or elements. Epoxy material is at present preferred. However, other plastic molding materials such as phenolics, silicones and the like can be used.

Since this all-plastic switch does not have any metallic shaft or housing, tensile strength is important as well as low shrinkage and moisture absorption, and good insulation and dielectric properties. The conductive elements are mainly plated areas and bridging resilient conductive elements in sliding contacting engagement therewith.

Further in accordance with the invention, a different basic operating principle from conventional and larger rotary switches is used. It is this difference which makes it possible to attain the miniaturized and lighter-than-normal switch construction. In conventional switches of this type, the rotor element is inside the stator element. In the miniaturized rotary switch in accordance with the invention, the rotor is outside the stator, thereby allowing maximum use of insulating materials for circuit isolation and to maximize electrical leakage paths between circuits. For this purpose, the circuit contact surfaces are provided on the outer periphery or about the circumference and are further isolated by indenting each contact surface which is plated preferably, or provided with a flat conductive element cemented thereto.

The invention will further be understood from the following description of one embodiment thereof when considered with reference to the accompanying drawings, and its scope is pointed out in the appended claims.

Figure 2:
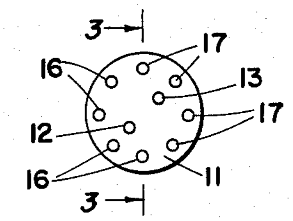
Figure 3:
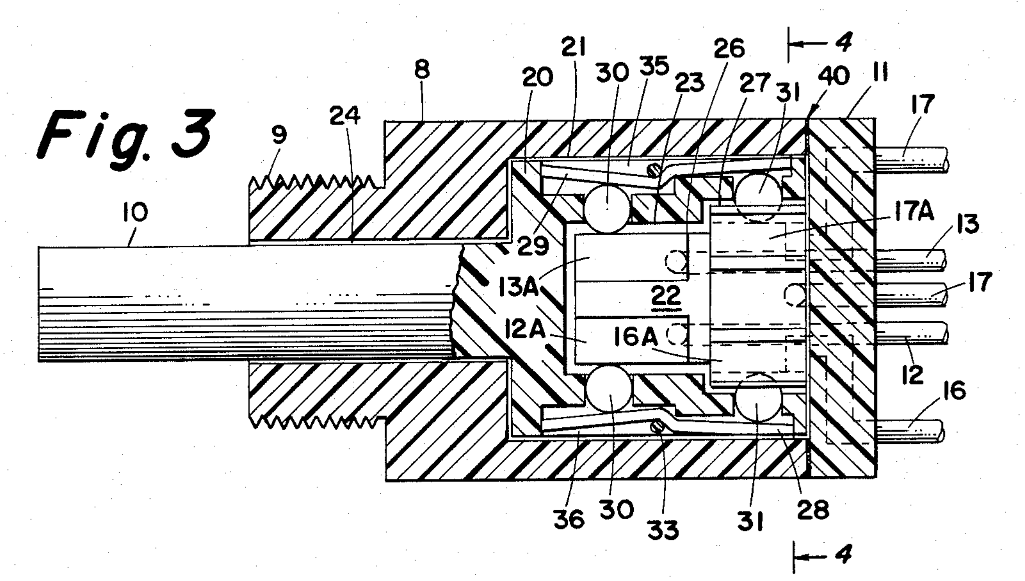
Figure 6:
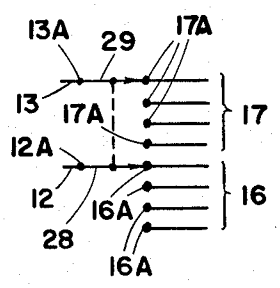
Figure 4:
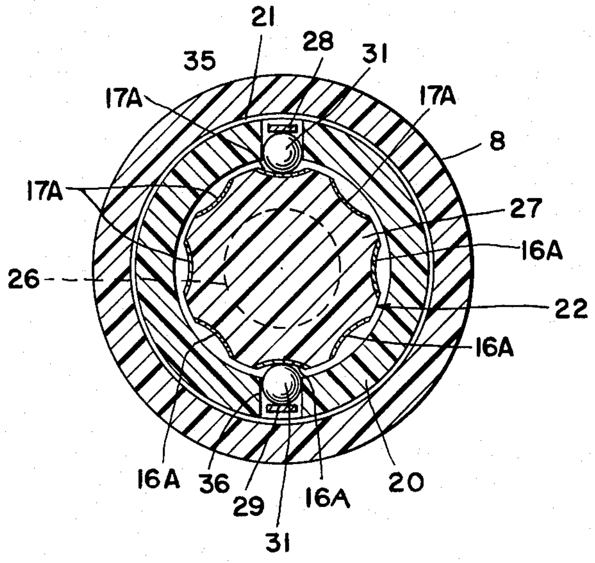
Figure 5:
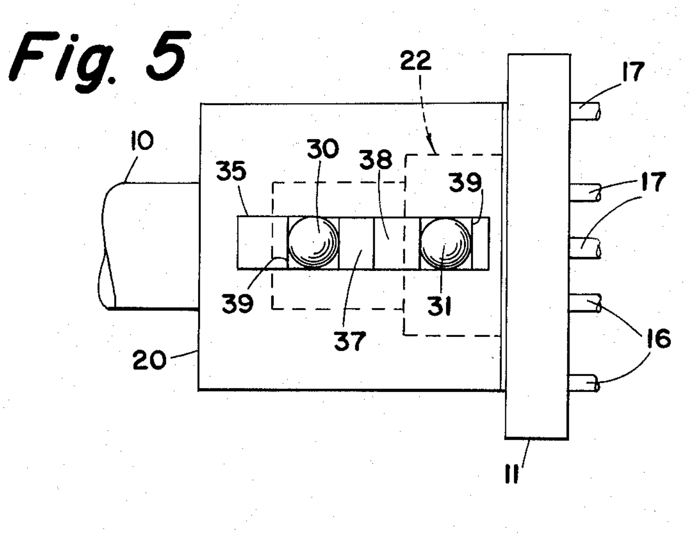

In the drawings:

FIGS. 1 and 2 are side and end views, respectively, of a miniature rotary selector switch embodying the invention, FIG. 3 is an enlarged longitudinal partial cross-sectional view of the switch shown in FIGS. 1 and 2, taken on the section line 3—3 of FIG. 2 and showing details of the interior construction thereof in accordance with the invention, FIG. 4 is a further cross-sectional end view of the switch of FIGS. 1 and 2, taken on the section line 4—4 of FIG. 3 and showing further details of construction in accordance with the invention, FIG. 5 is a top view of the assembled rotor and stator elements of the switch taken with reference to the position shown in FIG. 4, and FIG. 6 is a schematic circuit diagram of the conductive elements of the switch as shown in the preceding figures and the double-pole quadruple-throw or four-point circuit switching provided thereby.

Referring to FIGS. 1 and 2, the switch comprises a molded outer cylindrical casing 8 having an integral threaded single-hole mounting hub 9 at the forward end and which also serves as a bearing element for the central rotary operating shaft 10. The casing is open at the opposite end and is closed, when the parts are assembled therein by the base 11 of the stator element which will be described. The base 11 carries the input terminals 12 and 13 and two groups, 16 and 17, of four output terminals associated respectively with the input terminals 12 and 13 as will hereinafter appear.

Referring to FIGS. 3, 4 and 5 along with FIGS. 1 and 2, the plastic casing 8 provides a housing for the internal parts or elements which consist mainly of a plastic cylindrical rotor element 20 integral with the rotary operating shaft 10 and seated in an axial rear end cavity 21 in the casing, and a stator element 22 is nested concentric relation to the rotor element in an axial end cavity 23 therein. The stator element 22 extends axially inwardly from and is carried by the end plate or base 11 thereof which seats against the open end of the casing 8 as shown more clearly in FIG. 3. The operating shaft 10 extends through a central bearing opening 24 in the casing and the mounting hub 9.

The stator 22 is of two diameters or two coaxial sections 26 and 27 to provide rotational parallel-moving peripheral surfaces or contact areas along the axis and adapted to carry different members of angularly-spaced conductive contact elements for selective circuit switching by conductive bridging connections from one area to the other. These connections are provided through one or more resilient flexibly conductive spring-contact or brush elements 28 and 29, for example, having each two rolling ball contacts 30 and 31 at opposite ends and set for engaging the two contact areas 26 and 27 respectively as indicated.

The spring-contact or brush elements 28 and 29 and the respective ball contacts 30 and 31 therefor move with the rotor 20 to successive angularly-spaced stop positions to effect the bridging connections above referred to as a two-pole four-point selector switch. The smaller diameter section 26 of the stator has two relatively-wide conductive contact elements or areas 12A and 13A connected respectively with the input terminals 12 and 13, while the output terminals 16 and 17 are connected with two groups of four conductive contact elements or areas, 16A and 17A, equally angularly spaced on the periphery of the larger diameter section 27 of the stator 22, as indicated in FIGS. 3 and 4.

The contact elements 16A and 17A extend longitudinally in grooves which are indented radially into the stator surface on the larger diameter, as indicated in FIG. 4, whereby internal detent means are also provided for positioning the rotor at each switching or stop position in its rotation, by the ball contacts 31 seating therein. The brush elements are of conductive spring material in strip form, such as cadmium-plated spring steel strips. The ball contacts provide contact between the conductive elements of the stator and the brush elements, and may be of stainless steel or cadmium plated steel, copper or beryllium. The brush elements bridge between the ball contacts to transfer electrical information such as signal currents through the conductive paths thus formed, and also apply resilient mechanical pressure to both ball contacts to assure maximum surface contact between the plated elements, the ball contacts, and the brushes which are held in place by hinge elements of epoxy cement, as indicated at 33 in FIG. 3, substantially midway of their length.

The resilient spring contact or brush elements 28 and 29 and the ball contacts 30 and 31 are carried by the rotor in diametrically-opposite longitudinal surface slots 35 and 36 having lower and higher or upper radially-inner surface levels 37 and 38, respectively, to which the spring-contact or brush elements 28 and 29 are conformed to hold the ball contacts 30 and 31 in resilient engagement with the smaller and larger diameter sections 26 and 27 of the stator element 22. It will be noted that the inner surface of the slots 35 and 36 are provided with guide openings 39 through which the ball contacts 30 and 31 operate to contact the respective surface areas 26 and 27 of the stator 22 as the rotor 20 is rotated by the shaft 10 to different switching positions.

For the switch to be rotated to a different contact position, the ball contacts 31 must ride to the top of the grooves, across the outer circumference and down into the next grooves. The spring pressure holds the ball on each side in the groove and in contact with the contact element therein. The groove or indentation of the contact elements increases the separation between the contact surfaces, which is essential in miniature devices of this size. The dimensions indicated in FIG. 1 are maximum rather than minimum as permitted by the present improved construction, and are given only by way of example.

The rotor and stator elements may be constructed of the same plastic materials. The rotor is a holder for the brushes and ball contacts. On assembly the housing 8 and the stator 22 are bonded together by epoxy cement around the base as indicated at 40. The housing may be secured to any suitable support or mounting surface. The bonding thus prevents the stator from rotating when the rotor is operated.

The switch is assembled by inserting the stator 22 into the rotor 20. The ball contacts 30–31 are then dropped into the holes or opening 39 in the rotor. The brushes 28 and 29 are then inserted in the slots on top of the ball contacts under slight pressure. Epoxy cement is then applied to the rotor and brushes at 33 to lock the brushes into the rotor. The housing 8 is then slid down over the rotor shaft 10 until it makes contact with the base end of the stator. It is then bonded at the outer end of the housing at 40 as above noted.

The switch assembly is essentially a sealed switch, and may be completely sealed by using an O ring packing or the like between the rotor shaft 10 and the housing. The switch assembly shown is a two-pole, four-position or four-point, one deck design. The same configuration could be provided as a one-pole, eight-position or eight-point switch. By extending the body length of the switch it is possible to increase the number of decks. Decreased angular spacing between the contact elements on the stator outer diameter may provide up to twelve poles per deck.

Assuming signal or current input on the terminals 12 and 13, these are connected to the conductive plate areas 12A and 13A on the small diameter section 26 of the stator. The ball-bearing contacts 30 ride or rest on this small-diameter section and in contact each with one of the areas 12A and 13A and the respective brushes 28 and 29. The brushes are each also in contact with a second ball contact 31. This second contact 31 rides or rests on the circumference of the larger diameter section 27 of the stator 22, and seats in each of the grooves in firm contact with the contact or conductive plate area therein. These areas are connected with the output terminals 16 and 17, which are thus the output terminals.

The circuit diagram of FIG. 6 shows the two-pole, four-point selective switching provided by the above described switch. This will readily be understood as like parts in FIG. 6 are referenced to the preceding figures by the same reference numerals. Thus, through the bridging connection provided by the brush 28, the input terminal 12, connected to the contact area 12A, is selectively connected with the contact areas 16A in the grooves of the stator and thence to the output terminals 16.

Likewise the brush 29 provides a bridging connection between the ball contacts from the contact area 13A, and the input terminal 13, to othe output contact areas 17A and the output terminals 17 selectively. As indicated in the circuit diagram, the selector switch arms, provided effectively by the bridging brush elements, 28 and 29 and their ball contacts 30 and 31 are jointly rotated to mate with the contact areas 16A and 17A. This is accomplished by rotating the operating shaft 10 while the housing 8 is held stationary.

From the foregoing description it will be seen that for extreme miniaturization an improved rotary switch of the multipolar multi-contact type is provided in a relatively close-coupled compact structural unit. This comprises a cylindrical outer casing, a cylindrical coaxial rotor element in the casing having two longitudinally-spaced ball contacts and a conductive spring bridging element or brush providing a resilient connection between said contacts. The bridging element also provides a radially-inward biasing pressure on the ball contacts. A cylindrical stator element extends within the rotor element in coaxial relation thereto and is fixed to the casing as a closure means therefor. The stator element is provided with two longitudinally-spaced peripheral contact areas with which the ball contacts are held in resilient engagement.

Means providing a number of angularly spaced conductive contacts on one peripheral area corresponding to the number of poles for the switch and means providing a number of angularly-spaced conductive contacts on the other peripheral area corresponding to the number of points or circuit selections for the switch complete the conductive elements of the switch. Also the last-named contacts may be radially depressed to provide detent means for the ball contacts and define the selector stop positions for the rotor. Wire terminal elements for the switch are connected each with one of the stator contacts and extend exteriorly of the casing, as through the base of the stator, for external circuit connections.

The switch thus is one which may be constructed substantially of all molded low-cost, light and rugged plastic parts, with a minimum of conductive elements which are effectively ball-bearing type contacts in pairs and simple flat spring elements, one set for each pole desired. The fixed inner stator contacts in two longitudinally spaced circular paths with the external rotor resilient brush and ball contact bridge means between said paths, and rotatably movable along said paths to bridge contact areas thereon, is an improved structural arrangement highly adapted to miniaturization while preserving the desired circuit or conductor spacing and minimum signal or current leadage, ordinarily so difficult to attain in miniature switches of this type.

I claim:

1. A rotary selector switch comprising in combination, an open-ended cylindrical casing providing a fixed outer housing for said switch, a cylindrical rotor element seated and rotatable in said casing in coaxial relation thereto, two longitudinally-spaced conductive ball contacts with an elongated conductive resilient spring brush element carried by said rotor element and conductively bridging between said contacts, a cylindrical stator element connected with the casing and extending coaxially within said rotor element, means providing fixed equally angularly-spaced stator contact areas in two longitudinally-spaced peripheral paths contacted and bridged conductively by said ball contact and brush elements for selective switching by rotation of said rotor with respect to the stator and casing, the contact areas in one path being depressed radially to provide detent means for the ball contacts and define the selector switching stop positions for the rotor, and terminal elements connected each with one of said stator contact areas for external circuit connection with the switch.

2. A rotary selector switch as defined in claim 1, wherein the casing, stator and rotor are of molded plastic material providing insulation and light weight, and wherein the contact arms on the periphery of the stator are each provided by a conductive film.

3. A rotary selector switch as defined in claim 1, wherein the number of bridging elements and contact areas in one circular path on the stator is equal to the number of poles with which the switch operates, and wherein the number of contact areas in the other circular path on the stator is equal to the number of selector points with which the switch operates.

4. A rotary multipolar multi-point selector switch of the miniature type comprising in combination, an open-ended outer cylindrical casing of plastic material providing a fixed outer housing for said switch, a cylindrical rotor element of plastic material seated and rotatable in said casing in coaxial relation thereto, a rotary control shaft for said rotor extending axially therefrom through the casing for external operation of the rotor element, two longitudinally-spaced conductive ball contacts with an elongated spring brush element resiliently pressing and conductively bridging between said contacts mounted in angularly spaced sets in longitudinal slots in the rotor, said sets corresponding in number to the number of poles provided by said switch, a cylindrical stator element of plastic material extending axially within the rotor element in nested relation thereto and fixed to the casing as a closure means therefor, means on said stator providing fixed conductive contact areas in two longitudinally spaced peripheral circular paths positioned to be contacted and conductively bridged by said sets of ball contacts and brush elements, said contact areas being equally angularly spaced along each circular path and corresponding in number in one path to the number of poles provided by said switch and in the other path to the number of selector points provided by the switch, and the latter contact areas being radially depressed to provide detent means for the ball contacts and define the selector stop positions for the rotor, and wire terminal elements connected each with one of said stator contact areas for external circuit connections with said switch.

References Cited by the Examiner

UNITED STATES PATENTS

| | | | |
|---|---|---|---|
| 1,254,331 | 1/1918 | Le Blanc | 200—11 X |
| 2,201,882 | 5/1940 | Bryant et al. | 200—8 |
| 2,255,002 | 9/1941 | Rodanet | 200—11 |
| 2,470,643 | 5/1949 | Rath | 200—155 |

ROBERT K. SCHAEFER, *Primary Examiner.*

KATHLEEN H. CLAFFY, *Examiner.*

J. R. SCOTT, *Assistant Examiner.*